United States Patent [19]
Nachenberg

[11] Patent Number: 5,964,889
[45] Date of Patent: Oct. 12, 1999

[54] METHOD TO ANALYZE A PROGRAM FOR PRESENCE OF COMPUTER VIRUSES BY EXAMINING THE OPCODE FOR FAULTS BEFORE EMULATING INSTRUCTION IN EMULATOR

[75] Inventor: Carey S. Nachenberg, Northridge, Calif.

[73] Assignee: Symantec Corporation, Cupertino, Calif.

[21] Appl. No.: 08/843,512

[22] Filed: Apr. 16, 1997

[51] Int. Cl.⁶ .................................................... H04L 9/00
[52] U.S. Cl. .............................. 714/25; 714/28; 712/227
[58] Field of Search .................................. 370/397, 440, 370/419; 364/269.4, 709.05, 550; 395/186, 183.09, 183.14, 181, 187.01, 182.04, 700, 550, 183.01, 183.05, 800.23, 500; 380/4, 2.2; 371/48; 714/25, 28, 29, 32, 34, 799; 712/22

[56] References Cited

U.S. PATENT DOCUMENTS

| | | | |
|---|---|---|---|
| 4,819,234 | 4/1989 | Huber | 395/183.4 |
| 4,926,322 | 5/1990 | Stimac et al. | 395/500 |
| 4,975,950 | 12/1990 | Lentz | 380/4 |
| 5,121,345 | 6/1992 | Lentz | 380/4 |
| 5,144,660 | 9/1992 | Rose | 380/4 |
| 5,319,776 | 6/1994 | Hile et al. | 395/186 |
| 5,321,840 | 6/1994 | Ahlin et al. | 395/712 |
| 5,349,655 | 9/1994 | Mann | 395/182.04 |
| 5,359,659 | 10/1994 | Rosenthal | 380/4 |
| 5,398,196 | 3/1995 | Chambers | 395/183.04 |
| 5,408,642 | 4/1995 | Mann | 395/183.14 |
| 5,421,006 | 5/1995 | Jablon et al. | 395/183.12 |
| 5,440,723 | 8/1995 | Arnold et al. | 395/181 |
| 5,442,699 | 8/1995 | Arnold et al. | 380/4 |
| 5,485,575 | 1/1996 | Chess et al. | 395/183.14 |
| 5,765,030 | 6/1998 | Nachenberg et al. | 380/22 |
| 5,826,013 | 10/1998 | Nachenberg | 380/4 |
| 5,854,916 | 12/1998 | Nachenberg | 395/500 |

FOREIGN PATENT DOCUMENTS

| | | | |
|---|---|---|---|
| 0636977 A2 | 2/1995 | European Pat. Off. | G06F 11/00 |
| WO 93/25967 | 12/1993 | Japan | G06F 11/28 |
| WO 97/12322 | 3/1997 | WIPO | G06F 11/00 |

OTHER PUBLICATIONS

"Automated Program Analysis for Computer Virus Detection", *IBM Technical Disclosure Buletin*, vol. 34, No. 2, Jul. 1991, pp. 415–416.

"Artificial Immunity for Personal Computers", *IBM Technical Disclosure Bulletin*, vol. 34, No. 2, Jul. 1991, pp. 150–154.

Marshall G., "Pest Control", *LAN Magazine*, Jun. 1995, pp. 54–67.

Digitext, "Dr. Solomon's Anti–Virus Toolkit for Windows and DOS", S&S International PLC, Jan. 1995, pp. 1–15, 47–65, 77–77, 91–95, 113–115, and 123–142, United Kingdom.

(List continued on next page.)

*Primary Examiner*—Meng-Al T. An
*Assistant Examiner*—John Ciccozzi
*Attorney, Agent, or Firm*—Fenwick & West LLP

[57] ABSTRACT

A computer-implemented apparatus and method for countering attempts of polymorphic viruses to evade detection by emulation-based scanners. Such attempts try to exploit differences between the real and virtual execution of instructions. The invention includes a fault manager (158) integrated into the CPU emulator (154) of a virus scanner software product. Before each instruction is emulated by the CPU emulator (154), the fault manager (158) examines the opcode of the instruction to determine (310) whether a "fault" is triggered. If a fault is triggered, the fault manager (158) saves (314) a state record on a fault stack (162), then interrupts (316) to a corresponding fault handler routine (160). The criteria for triggering a fault and the corresponding fault handler routine (160) may be obtained from an updatable data file (164).

16 Claims, 2 Drawing Sheets

OTHER PUBLICATIONS

Veldman, Frans, "Virus Writing Is High–Tech Infosecurity Warfare", Security on the I–Way '95, 1995, pp. L–1, L–16, U.S.A.

Symantec Corporation, "Norton AntiVirus for Windows 95 & Special Subscription Offer", 1995 U.S.A.

ThunderBYTE B.V., "User Manual", 1995, pp. 1–191, Wijchen, The Netherlands.

"Virus Infection Techniques: Part 3", Virus Bulletin, 1995, pp. 006–007, Oxfordshire, England.

Cohen, Federick B., "A Short Course on Computer Virus—2d Ed.", John Wiley & Sons, Inc., pp. 54–55, 199–209, 1994, U.S.A.

Veldman, Frans, "Heuristic Anti–Virus Technology", Proceedings of the International Virus Protection and Information Security Council, Apr. 1, 1994.

Wells, Joseph, "Viruses in the Wild", Proceedings of the International Virus Protection and Information Security Council, Apr. 1, 1994.

Gordon, Scott, "Viruses & Netware", Proceedings of the International Virus Protection and Information Security Council, Mar. 31, 1994.

Solomon, Alan, "Viruses & Polymorphism", Proceedings of the International Virus Protection and Information Security Council, Mar. 31, 1994.

Case, Tori, "Viruses: An Executive Brief", Proceedings of the International Virus Protection and Information Security Council, Mar. 31, 1994.

Skulason, Fridrik, "For Programmers", Virus Bulletin, Jul. 1990, pp. 10–11, Oxon, England.

Gotlieb, L., "End Users and Responsible Computing", *CMA—the Management Accounting Magazine,* vol. 67, No. 7, Sep. 1993, pp. 13.

Karney, J., "Changing the Rules on Viruses", PC Magazine, vol. 13, No. 14, Aug. 1994, pp,.NE36.

Schnaidt, P., "Security", *LAN Magazine,* vol. 7, No. 3, Mar. 1992, pp. 19.

"UK–Sophos Intros Unix Virus Detection Software Jan. 26, 1995", *Newsbytes News Network,* Jan. 26, 1995.

"Anti–Virus Company Claims Polymorphic Breakthrough Jul. 10, 1992", *Newsbytes News Network,* Jul. 10, 1992.

"LAN Buyers Guide: Network Management", *LAN Magazine,* vol. 7, No. 8, Aug. 1992, pp. 188.

METHOD TO ANALYZE A PROGRAM FOR PRESENCE OF COMPUTER VIRUSES BY EXAMINING THE OPCODE FOR FAULTS BEFORE EMULATING INSTRUCTION IN EMULATOR

TECHNICAL FIELD

This invention pertains to the field of emulator-based antivirus software, in which a program file is scanned for the presence of computer viruses by executing it in a software-based CPU emulator.

BACKGROUND ART

Most simple computer viruses work by copying exact duplicates of themselves to each executable program file they infect. When an infected program executes, the virus gains control of the computer and attempts to infect other files. If it locates a target executable file for infection, it copies itself byte-for-byte to the target executable file. Because this type of virus replicates identical copies of itself each time it infects a new file, the virus can be easily detected by searching in files for a specific string of bytes (i.e. a "signature") that has been extracted from the virus.

Simple (non-polymorphic) encrypted viruses comprise a decryption routine (also known as a decryption loop) and an encrypted viral body. When a program file infected with a simple encrypting virus executes, the decryption routine gains control of the computer and decrypts the encrypted viral body. The decryption routine then transfers control to the decrypted viral body, which is capable of spreading the virus. The virus is spread by copying the identical decryption routine and the encrypted viral body to the target executable file. Although the viral body is encrypted and thus hidden from view, these viruses can be detected by searching for a signature from the unchanging decryption routine.

Polymorphic encrypted viruses ("polymorphic viruses") comprise a decryption routine and an encrypted viral body which includes a static viral body and a machine-code generator often referred to as a "mutation engine." Initially, the operation of a polymorphic virus is similar to the operation of a simple (non-polymorphic) encrypted virus. When a program file infected with a polymorphic virus executes, the decryption routine gains control of the computer and decrypts the encrypted viral body. The decryption routine then transfers control of the computer to the decrypted viral body, which is capable of spreading the virus. However, the virus is spread by copying a newly generated decryption routine along with the encrypted viral body to the target executable file. The newly generated decryption routine is generated on the fly by the mutation engine. In many polymorphic viruses, the mutation engine generates decryption routines that are functionally the same for all infected files, but use different sequences of instructions to function. Common mutation strategies employed by the mutation engine include reordering of instructions, substituting equivalent instructions or equivalent sequences of instructions, and inserting instructions that have no effect on functionality. Because of these multifarious mutations, these viruses cannot be detected by simply searching for a signature from a decryption routine because each decryption routine may have a different signature.

In order to detect the growing number of polymorphic viruses, antivirus software companies are beginning to adopt emulator-based antivirus technology, also known as Generic Decryption (GD) technology. The GD scanner works in the following manner. Before executing a program suspected of being infected on the actual CPU (central processing unit) of the computer, the GD scanner loads the program into a software-based CPU emulator which acts as a simulated virtual computer. The program is allowed to execute freely within this virtual computer. If the program does in fact contain a polymorphic encrypted virus, the decryption routine is allowed to decrypt the viral body. The GD scanner can then detect the virus by searching through the virtual memory of the virtual computer for a signature from the decrypted viral body.

In order to avoid detection by a GD scanner, a polymorphic virus may take advantage of differences between the "virtual" execution of the program by the scanner's CPU emulator and the "real" execution of the program by the actual CPU of the computer. The existence of various differences between "virtual" and "real" executions are practically inevitable.

First, the scanner's CPU emulator may incorrectly implement an instruction. For example, the emulator may incorrectly implement a bit shift instruction. Changing or patching the scanner software to correct this flaw and distributing the new version or patch may be prohibitively difficult and expensive.

A polymorphic virus may take advantage of this flaw by using the incorrectly implemented instruction in its decryption routine. As a result, the virus would fail to decrypt when emulated and so avoid detection by the scanner. Nevertheless, the virus would still decrypt properly when executed by the actual CPU and subsequently gain control of the computer.

Second, the CPU emulator might emulate a version of the CPU that is different from the version of the CPU in the computer. The particular version that is emulated matters because different versions of the CPU may have slightly different behaviors. For example, the Intel 8086 CPU provides a "POP CS" instruction which can be used to do an inter-segment jump. This same instruction is interpreted as a double-precision shift on Intel's 80386, 80486, and Pentium CPUs. Modifying the scanner software to properly emulate all versions of a CPU may be difficult and may result in substantial inefficiencies in the scanning process.

A polymorphic virus may take advantage of this flaw by using such an instruction in its decryption routine. As a result, the virus would fail to decrypt properly when emulated and so avoid detection by the scanner. Nevertheless, the virus would still decrypt properly when executed by certain versions of the actual CPU. Such a virus would be able to avoid detection by the scanner and still take control of those computers based on certain versions of the CPU.

Third, "non-deterministic" events in the environment of the actual CPU cannot be fully duplicated by the scanner's CPU emulator. For example, an I/O port value may change during a program's operation.

A polymorphic virus may take advantage of the existence of such events by reading, for example, the I/O port value and decrypting itself only if the port value was 55. Such a virus would not decrypt when emulated and thus avoid detection, unless it read the value 55 from the virtual port corresponding to the I/O port. Nevertheless, when executed on the actual CPU, the virus might read the value 55 from the I/O port and so decrypt properly.

Fourth, for reasons of efficiency and practicality, the CPU emulator executes only a limited number of instructions before deciding whether or not a file is infected. The greater the number of emulated instructions necessary to determine the infected or uninfected status of a program, the longer a user will have to wait before the scanner finishes checking the program.

To take advantage of this, a polymorphic virus may use large numbers of do-nothing instructions and/or dummy loops in their decryption routines in order to greatly increase the number of emulated instructions required to detect it. If the scanner does not emulate a large enough number of instructions for the virus to decrypt, the virus avoids detection.

DISCLOSURE OF INVENTION

Described is a computer-implemented apparatus and method for countering attempts of polymorphic viruses to evade detection by emulation-based scanners. Such attempts try to exploit differences between the real and virtual execution of instructions. The invention includes a fault manager (158) integrated into the CPU emulator (154) of a virus scanner software product. Before each instruction is emulated by the CPU emulator (154), the fault manager (158) examines the opcode of the instruction to determine (310) whether a "fault" is triggered. If a fault is triggered, the fault manager (158) saves (314) a state record on a fault stack (162), then interrupts (316) to a corresponding fault handler routine (160). The criteria for triggering a fault and the corresponding fault handler routine (160) may be obtained from an updatable data file (164).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
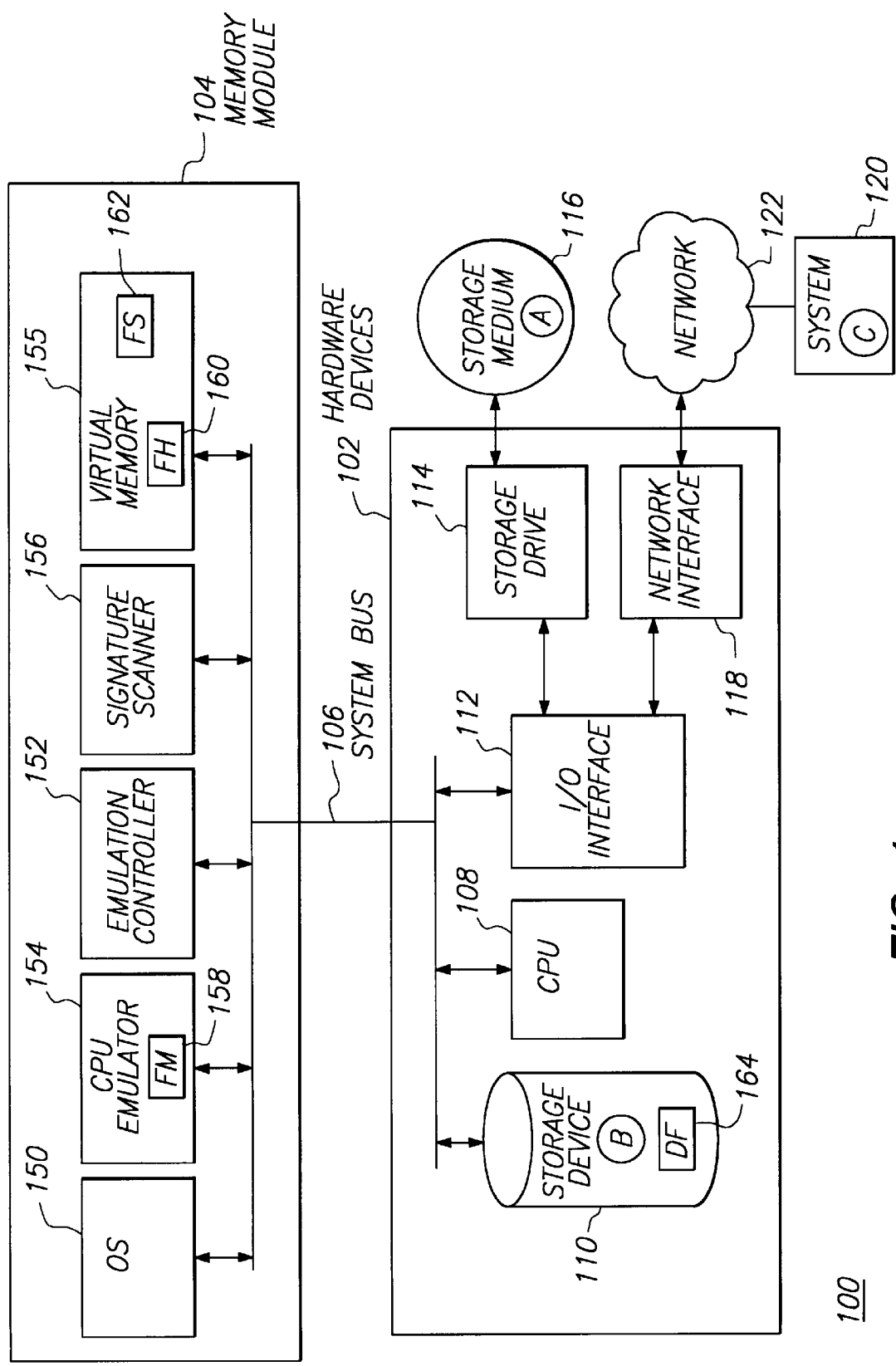
FIG. 1 is a block diagram illustrating a structure of a computer platform which includes devices to manage and handle emulation faults in a preferred embodiment of the present invention.

FIG. 1 is a block diagram illustrating a structure of a computer platform which includes devices to manage and handle emulation faults in a preferred embodiment of the present invention. The computer platform 100 includes hardware devices 102 and a memory module 104 for storing programs and data. Communications between the memory module 104 and the hardware devices 102 occurs through the system bus 106.

Preferably, the hardware devices 102 include, but are not limited to: a central processing unit (CPU) 108 (e.g., an Intel "x86" or a Motorola PowerPC processor) communicating with: a storage device 110 (e.g., a hard disk drive) and an input/output (I/O) interface 112 (e.g., a small computer system interface (SCSI) or a Personal Computer Memory Card International Association (PCMCIA) interface). Communicating with the I/O interface 112 are: a storage drive 114 (e.g., a floppy disk drive), which can read programs and data from a storage medium 116 (e.g., a floppy disk), and a network interface 118 (e.g., an Ethernet card or a modem), which communicates with a remote system 120 via a network 122 (e.g., a local area network, a wide area network, an intranet, or the global public Internet). A software program (or a data file) suspected of having a computer virus may be stored either on the storage medium 116 (A), the storage device 110 (B), or the remote system 120 (C).

Preferably, the programs and data stored in the memory module 104 include, but are not limited to: an operating system (OS) 150 (e.g., Windows 3.1, Windows 95, or Windows NT from Microsoft, OS/2 from IBM, or Macintosh OS from Apple Computer, or a flavor of UNIX), an emulation controller 152, a CPU emulator 154, virtual memory 155, and a signature scanner 156. The CPU emulator 154 includes a fault manager (FM) module 158. The virtual memory 155 includes fault handler (FH) routines 160 and a fault stack (FS) 162. In the preferred embodiment, the FH routines 160 are service routines located in virtual memory 155 along with the potentially infected program. Nevertheless, it is possible in an alternative embodiment to instead store the FH routines 160 in virtual read only (protected) memory to protect the FH routines 160 from "retro-viruses" that may try to overwrite or mangle them. The functions and operation of the FM 158, FH routines 160, and FS 162 are described below with reference to FIG. 3. Details of the operation of the FM 158, FH routines 160, and FS 162 depend on data stored in an updatable data file (DF) 164. The data file 164 may be updated by the transfer of new data via the storage drive 114 or the network interface 118.

The emulation controller 152 controls the CPU emulator 154. Among other functions, the emulation controller 152 determines when to halt the emulation of a file and begin scanning for viral signatures.

The CPU emulator 154 executes files in a fully contained virtual environment. The virtual environment includes the virtual memory 155 which is effectively independent of the memory of the host computer system. In this way, the CPU emulator 154 is effectively isolated from the actual hardware devices 102 so that no harm can be done by a virus while a file is being simulated.

If the file appears to contain an encrypting virus, the emulation controller 152 will continue the emulation until the virus has decrypted and/or transferred control to itself. After the emulation is finished, the signature scanner 156 searches the virtual memory 155 for known virus signatures.

Figure 2:
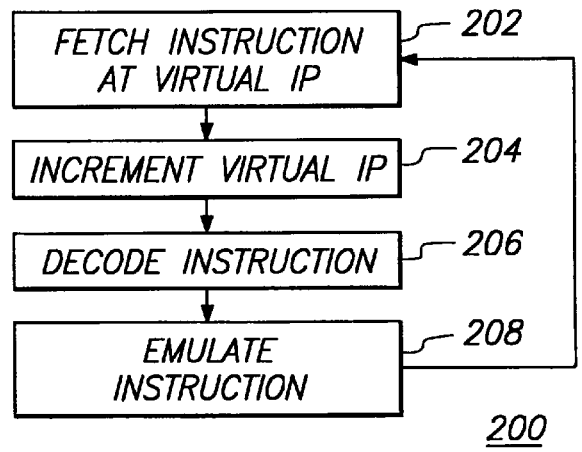
FIG. 2 is a flow diagram of a process to emulate a program.

FIG. 2 is a flow diagram of a process 200 to emulate a program. The process 200 includes fetching 202 an instruction at a virtual instruction pointer (IP) incrementing 204 the virtual IP, decoding 206 the instruction, and emulating 208 the instruction.

First, the CPU emulator 154 fetches 202 the instruction at the virtual IP from the virtual memory 155. Next, the value of the virtual IP register of the CPU emulator 154 is incremented 204. The CPU emulator 154 then decodes 206 the fetched instruction, and then emulates 208 the execution of the decoded instruction. Subsequently, the process 200 loops back and fetches 202 the instruction at the incremented virtual IP.

Figure 3:
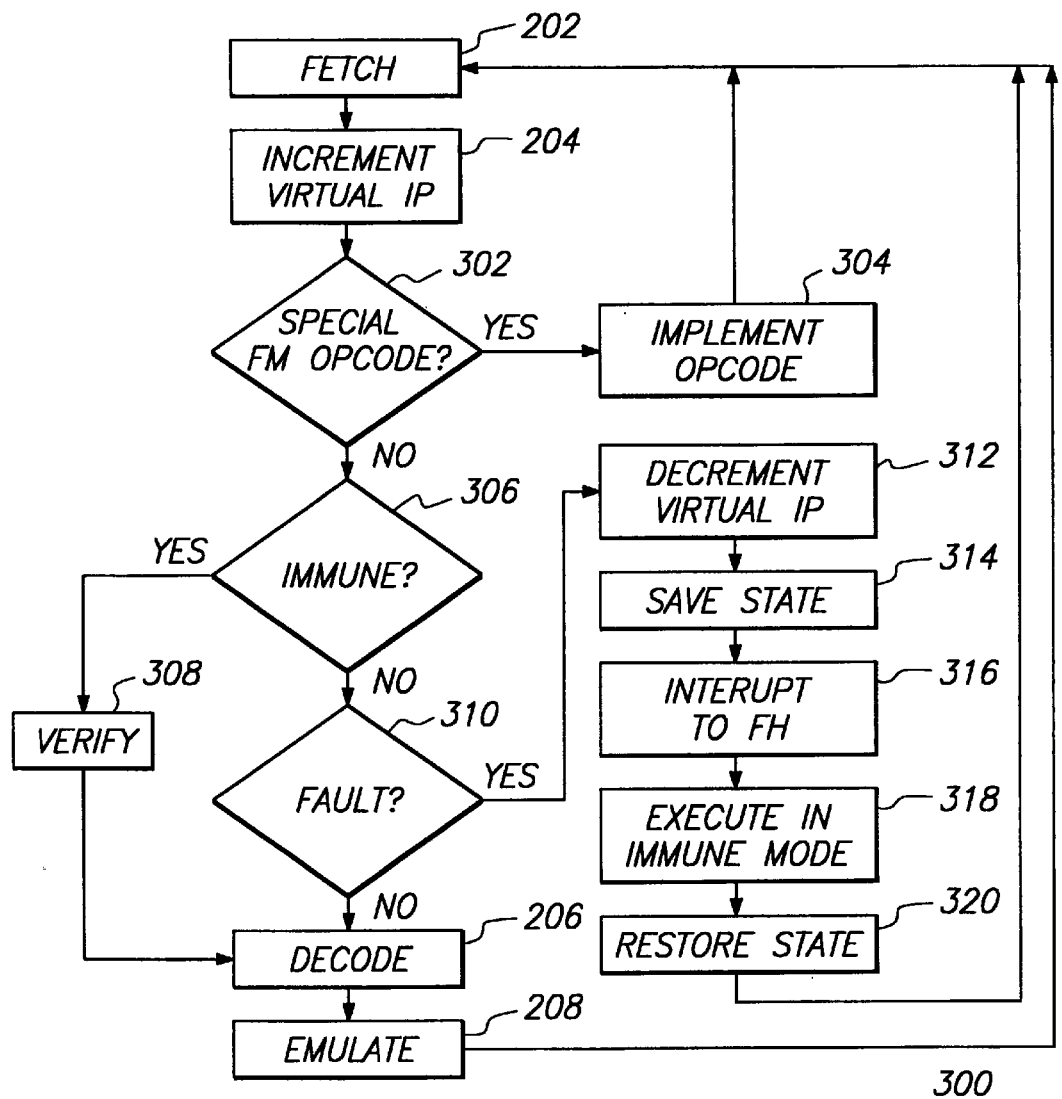
FIG. 3 is a flow diagram of a process to emulate a program including a method of fault management in a preferred embodiment of the present invention.

FIG. 3 is a flow diagram of a process 300 to emulate a program including a method of fault management in a preferred embodiment of the present invention. In the process 300 of FIG. 3, the fault management method is incorporated into the process 200 shown in FIG. 2. Although in the preferred embodiment of this invention the fault management method appears incorporated between the increment 204 and decode 206 steps, the fault management method may also be incorporated between the fetch 202 and increment 204 steps (or between the decode 206 and emulate 208 steps) in an alternative embodiment to the present invention.

After the CPU emulator 154 fetches 202 the instruction at the virtual IP and increments 204 the virtual IP, the fault manager (FM) 158 of the CPU emulator 154 determines 302 whether the opcode is a special FM instruction (understood by the FM 158, but not otherwise understood by the CPU emulator 154). If the opcode is a special FM opcode, then the fault manager 158 implements 304 the opcode before looping back to the step of fetching 202 the instruction at the virtual IP.

In a preferred embodiment, special FM opcodes include ones named: No-Fault, Fault-Return, Load-Prefetch, Store-Prefetch, Reset-Prefetch, Suspend-Fault, and Get-C SIP-Queue-Value The function and operation of these FM opcodes are described below.

If the opcode is not a special FM opcode (i.e. it is an ordinary CPU opcode), then the fault manager 158 determines 306 whether an "immune from faulting" mode is on or off. If the immune mode is on (e.g., because a fault handler routine 160 is currently executing 318 or the instruction has already been investigated 310 by the fault manager 158), then no additional faults are allowed to trigger, so the process 300 skips the fault determination step 310. Instead the process 300 first verifies 308 that a fault handler routine 160 has not been executing 318 for too many cycles, then goes ahead to the step of decoding 206 the instruction. The verification step 308 is a safety net to limit the number of instructions that a mangled or poorly written fault handler routine 160 may execute 318 so that it does not run forever within the virtual computer. In the preferred embodiment, this limit number is specified in a data file which is not modifiable by the fault handler 160 itself so that the fault handler 160 is constrained against causing the computer to hang. The data file may be an updatable data file 164.

If the immune mode is off (e.g., because the instruction has not yet been investigated 310 for faults), then the fault manager 158 determines 310 whether the instruction generates a fault. This determination 310 is made with reference to a list of faulting instructions. This list may be a "soft" list in that it may come from the updatable data file 164.

If a fault is generated, then the fault manager 158 first decrements 312 the virtual IP. This is done so that, when control is returned from the fault handler 160, the emulation will continue at the just-faulted-on instruction.

After decrementing 312 the virtual IP, the fault manager 158 saves 314 the state of the CPU emulator 154 onto a special fault stack (FS) 162. This is done to preserve the CPU environment in which the just-faulted-on instruction is to be emulated. In this embodiment the fault stack 162 is configured to be located in virtual memory 155 (in the area typically occupied by CGA video RAM, where viruses cannot reside). Although the CPU emulator state could be simply saved 314 onto the SS:SP stack, it is not. This is because use of that stack may be used to evade detection by polymorphic viruses that store temporary data below the stack pointer. In such a case the scanner may inadvertantly overwrite the temporary data of the virus, causing the virus to malfunction during emulation (but not during real execution by the actual CPU).

In a preferred embodiment, components of the CPU emulator state saved 314 onto the fault stack 162 include the following:

| | |
|---|---|
| the virtual instruction pointer (IP); | (pushed last) |
| the virtual code segment (CS); | |

-continued

| | |
|---|---|
| the flags; | |
| the virtual stack pointer (SP); | |
| the virtual stack segment (SS); and | |
| the status bits (segment prefix overrides, | (pushed first) |
| REP statuses, etc.). | |

As indicated above, status bits are pushed first, then SS, then SP, then the flags, then the CS, and finally the IP. Thus, IP is at the top of the stack. In an alternative embodiment, other components may be saved 314, and which components are saved 314 may depend on the data in an updatable data file 164.

In a preferred embodiment, values of other segment prefixes and of the virtual general registers (EAX, ESI, etc.) are not necessarily saved onto the fault stack 162 in order to save the additional time the saving would take. Instead, a fault handler routine 160 pushes the value of such a prefix segment or general register onto the fault stack 162 only if it intends to use the particular register for its own purposes. Thus, these segment prefixes and general registers are saved on a need-to-use basis only. Other components of the CPU emulator state may also be saved on such a need-to-use basis by the fault handler routines 160.

After the CPU emulator state is saved 314, emulation is interrupted 316 to the virtual CS:IP of a particular fault handler routine 160, where execution continues 318 in the immune from faulting mode (otherwise an endless recursive faulting condition may be entered). In addition to being in the immune mode, the CPU emulator's prefetch queue is disabled. This disabling of the prefetch queue avoids the need to save the prefetch queue's contents whenever a fault is triggered. In an alternative embodiment, it is possible that the prefetch queue might not be disabled.

An advantage of this fault management system is the flexibility of its architecture which allows for the creation and updating of new fault handler 160 service routines to counter the evasion efforts of new or mutated viruses. Once control over the virtual computer has been transferred via the interrupt 316 to a fault handler 160 service routine, the service routine can issue commands (both species FM instructions and ordinary CPU instructions) to examine or modify the contents of the virtual memory 155 (including the fault stack 162 stored therein), the virtual prefetch queue, the virtual registers, the virtual flags, and so on. Such commands enable the service routine to determine whether or not the just-interrupted program is doing something suspicious that warrants intervention and to intervene as warranted.

Typically, if the service routine determines that intervention is not warranted, then the service routine issues a No-Fault opcode followed by a Fault-Return opcode (both are special FM opcodes). Fault-Return causes the emulator 154 to revert to the saved CPU state and continue fetching 202 and emulation at the virtual CS:IP corresponding to the opcode that was just faulted on. However, in order to prevent the fault manager 158 from faulting on this same instruction a second time, a No-Fault opcode precedes the Fault-Return. No-Fault tells the fault manager 158 to exclude the just-faulted-on instruction from causing another fault. This no-fault state is reset as soon as the just-faulted-on instruction has been fetched and emulated. Thus, if this instruction is fetched at a later time, it will once again cause the fault manager 158 to generate a fault. On the other hand, if the service routine determines that intervention is warranted, then the service routine intervenes in a fashion tailored to correct the particular problem determined to exist.

For example, the fourth problem described above in the background art relates to viruses that use large numbers of do-nothing instructions or dummy loops in their decryption routines to greatly increase the number of emulated instructions required to detect it. Such viruses include a family of viruses known as "TPE" viruses. TPE viruses employ the following dummy code in their decryption routines:

| offset | machine code | interpretation |
| --- | --- | --- |
| ... | | |
| 110 | 90 | ;no operation |
| 111 | E2 FD | ;loop back to the no operation instruction and decrement CX until CX is zero |
| ... | | |

The above code is basically a time-wasting loop that executes a dummy instruction (no operation) for a number of times equal to the value of the CX register when the loop begins. The viral code does not set the value of the CX register, so it could loop anywhere from once to 64k (the maximum value of CX) times. Similar dummy loops are created by TPE viruses using the E0, E1, or E3 opcode (instead of E2). A notable feature of dummy loops created by TPE viruses is that they always jump back to an immediately preceding one-byte instruction.

If it were not for dummy loops like the one above, TPE viruses would decrypt themselves in less than 16k emulated instructions. However, the presence of a variable number of these dummy loops causes TPE viruses to require typically 500k or more emulated instructions before decrypting. Clearly, this is a problem because it would be a burden to emulate so many instructions for every program to make sure they are uninfected by a TPE virus.

Fortunately, this fault management system is capable of detecting such dummy loops and skipping over them. In the preferred embodiment, the fault manager 158 is configured to generate a "TPE" fault when the opcode E0, E1, E2, or E3 is to be emulated (unless immune mode is on) and at least 500 instructions have been emulated from the file currently being scanned. The reason generating such faults only after 500 instructions have been emulated is this avoids generating such faults for most files (a mere 5 to 10 emulated instructions is necessary to determine that a typical file is uninfected).

Generation of the TPE fault triggers the emulation of a corresponding "TPE" service routine. The TPE service routine first determines whether the loop jumps back to an immediately preceding one-byte instruction.

If the loop does not jump back to an immediately preceding one-byte instruction, then no further investigation or intervention is warranted and the TPE service routine issues a Suspend-Fault instruction followed by No-Fault and Return-Fault. The Suspend-Fault opcode is a special FM opcode which causes the disabling of a specified fault for a specified number of emulated instructions. Here, Suspend-Fault is used to disable the TPE fault for the remainder of the emulation of the file being scanned. As described above, No-Fault excludes the just-faulted-on instruction from causing another fault, and Fault-Return causes the emulator 154 to revert to the saved CPU state and continue fetching 202 and emulation at the IP of the opcode that was just faulted on (here, the IP containing the E0, E1, E2, or E3 opcode).

If the loop does jump back to an immediately preceding one-byte instruction, then the TPE service routine intervenes by zeroing the CX register just as if the loop had finished and changing the virtual IP to point to the instruction immediately following the dummy loop. The TPE routine then issues Reset-Prefetch and Fault-Return opcodes. Reset-Prefetch resets the prefetch queue (as its name implies) and is necessary because the routine changed the virtual IP (thus invalidating the contents of the prefetch queue).

Example source code (in assembly language) is given below for the TPE service routine which corresponds to TPE faults (fault #0):

```
org FAULT_START
push ds                         ; save the DS register since it will be used as a working register
push bx                         ; save the BX register since it will be used as a working register
move bx, sp                     ; BX = fault stack pointer
move ds, ss:[bx+6]              ; DS = CS of suspended program
move bx, ss:[bx+4]              ; BX = IP of suspended program
move bx, [bx]                   ; BX = 2-byte opcode (E0, E1, E2, or E3) of suspended program
cmp bh, 0fdh                    ; if loop destination is one byte up, then got TPE dummy loop
je dummy_loop                   ; go to code to deal with dummy loop problem; else its a legit loop
pop bx                          ; restore BX
pop ds                          ; restore DS
db 'c',90h,07h                  ; Suspend-Fault
db 0                            ; for TPE faults
dd ffffffffh                    ; for practically infinite number of emulated instructions
db 'c',90h,02h                  ; No-Fault
db 'c',90h,03h                  ; Fault-Return
dummy_loop:
mov cx, 0                       ; zero the CX register
mov bx, sp                      ; BX = fault stack pointer
add word ptr ss:[bx+4], 02h     ; change IP to skip over loop
mov word ptr ss:[bx+0eh], 0     ; remove all prefixes used on prior instruction.
                                ; These prefixes were saved on the fault stack
                                ; and will be popped and restored on Fault-Return.
pop bx                          ; restore BX
pop ds                          ; restore DS
db 'c', 90h, 04h                ; Reset-Prefetch queue
db 'c', 90h, 03h                ; Fault-Return.
```

As shown by the above example, this system to manage and handle emulation faults is very flexible and can be configured to handle a wide variety of problems in order to make a virus scanner more robust and more efficient. The preferred embodiment includes service routines to handle each of the four problems described in relation to the background art.

Besides the FM opcodes that are described in the above example (i.e. Fault-Return, No-Fault, Suspend-Fault, and Reset-Prefetch), the preferred embodiment includes additional opcodes named: Load-Prefetch, Store-Prefetch, Get-CSIP-Queue, and In-Repair. Load-Prefetch can be used to copy the contents of the emulator's prefetch queue into virtual memory 155. This allows a fault handler routine to then examine or modify the copy of the prefetch queue. This is useful when the fault handler routine is changing CS:IP in order to properly handle a fault, since the prefetch queue cannot be out-of-sync with CS:IP. Store-Prefetch can be used to copy the contents of a prefetch queue stored in virtual memory 155 back to the emulator's prefetch queue. This is typically used after Load-Prefetch and subsequent modifications to the prefetch queue. Get-CSIP-Queue can be used to obtain the CS:IP values of the last 64 emulated instructions of the program being scanned (as opposed to the fault handler routine). The Intel architecture supports variable-length instructions which makes it difficult to look back in the instruction stream to determine what previous instructions were emulated. However, the fault manager 158 maintains a queue of the CS:IP values for the last 64 emulated instructions of the program being scanned. Get-CSIP-Queue allows a fault handler routine to examine and use these CS:IP values and the instructions to which they point. This simplifies code analysis and reduces the number of incorrect assumptions made by fault handler routines.

Finally, when execution 318 of the service routine is completed (and control transferred back via Fault-Return), the fault manager 158 restores 320 the state of the CPU emulator 154 from the fault stack 162, then loops back to the step of fetching 202 the instruction at the virtual IP.

Thus, the fault management system of the present invention serves to prevent a virus from using dummy loops to avoid detection. Similarly, the system can prevent a virus from using a particular port value to avoid detection. To do so, a fault would be generated by the limited number of instructions that read from a port, triggering a corresponding fault handler routine 160 to investigate further. Similarly, the system can prevent a virus from avoiding detection using an instruction which is either interpreted differently by different CPU versions or incorrectly implemented by the CPU emulator 154. To do so, a fault would be generated by such instructions, triggering a corresponding fault handler routine 160 to investigate further.

The above description is included to illustrate the operation of the preferred embodiment and is not meant to limit the scope of the invention. The scope of the invention is to be limited only by the following claims. From the discussion above, many variations will be apparent to one skilled in the art that would yet be encompassed by the spirit and scope of the invention.

What is claimed is:

1. A computer-implemented method for using virtual fault management to analyze a program for presence of computer viruses, the method comprising the steps of:
   fetching an instruction of the program, the instruction including an opcode;
   determining whether a fault is generated by the opcode;
   saving components of a state of an emulator if the fault is generated; and
   interrupting to a fault handler routine.

2. The method of claim 1, wherein the components include a stack pointer.

3. The method of claim 1, wherein the fault handler routine is stored in virtual memory.

4. A computer-implemented method for emulating execution of a program, the method comprising the steps of:
   fetching an instruction of the program, the instruction including an opcode;
   determining whether a fault is generated by the opcode;
   emulating the instruction in an emulator; and interrupting to a fault handler routine, wherein the fault handler routine is obtained from an updatable data file.

5. The method of claim 1, further comprising the step of executing the fault handler routine in the emulator.

6. A computer-implemented method for emulating execution of a program, the method comprising the steps of:
   fetching an instruction of the program, the instruction including an opcode;
   determining whether a fault is generated by the opcode;
   emulating the instruction in an emulator;
   interrupting to a fault handler routine; and executing the fault handler routine in the emulator, wherein the step of executing of the fault handler routine is performed while the emulator is in a mode immune from generating faults.

7. The method of claim 6, wherein a prefetch queue is disabled during the step of executing the fault handler routine.

8. The method of claim 6, further comprising the step of skipping determining whether a fault is generated if the emulator is in the mode immune from generating faults.

9. The method of claim 8, further comprising the step of verifying that the fault handler routine has not been executing for too many cycles.

10. A computer-implemented method for emulating execution of a program, the method comprising the steps of:
    fetching an instruction of the program, the instruction including an opcode;
    determining whether a fault is generated by the opcode;
    emulating the instruction in an emulator; and
    determining whether the opcode is one of a set of special fault management opcodes, wherein the set of special fault management opcodes includes a Suspend-Fault opcode.

11. A system for using virtual fault management to analyze a program for presence of computer viruses, the system comprising:
    a CPU emulator for emulating instructions of the program; and
    a fault manager incorporated into the CPU emulator for determining whether faults are generated by the instructions.

12. The system of claim 11, further comprising a fault handler in virtual memory accessible to the CPU emulator for servicing the faults generated.

13. A computer program product comprising a computer-usable medium having computer-readable code embodied therein for using virtual fault management to analyze a program for presence of computer viruses, said product comprising:
    at least one computer-readable program code device configured to fetch an instruction of the program, the instruction including an opcode;
    at least one computer-readable program code device configured to determine whether a fault is generated by the opcode; and
    at least one computer-readable program code device configured to emulate the instruction in an emulator.

14. The product of claim 13, further comprising at least one computer-readable program code device configured to save components of a state of the emulator if the fault is generated.

15. The product of claim 13, further comprising at least one computer-readable program code device configured to interrupt to a fault handler routine.

16. The product of claim 13, further comprising at least one computer-readable program code device configured to determine whether the opcode is one of a set of special fault management opcodes.

* * * * *